Oct. 1, 1940.  W. MAUTZ  2,216,646
LIQUID FILTER
Filed Oct. 21, 1938  2 Sheets-Sheet 1

Inventor:
WOLFGANG MAUTZ

By Young, Emery & Thompson
Attys.

Oct. 1, 1940. W. MAUTZ 2,216,646
LIQUID FILTER
Filed Oct. 21, 1938 2 Sheets—Sheet 2

Inventor,
WOLFGANG MAUTZ
By Young, Emery & Thompson
Attys.

Patented Oct. 1, 1940

2,216,646

UNITED STATES PATENT OFFICE 2,216,646

LIQUID FILTER

Wolfgang Mautz, Kronberg, Taunus, near Frankfort-on-the-Main, Germany

Application October 21, 1938, Serial No. 236,338
In Germany October 21, 1937

2 Claims. (Cl. 210—169)

Liquid filters are known which consist of a pile of separate filter chambers located parallel to one another and consisting of resilient impermeable discs provided with openings for liquid and interposed disc-shaped filtering means. The discs are pressed against one another when assembling the filter pile and thus the filtering medium is clamped firmly in position.

The filtering material bears against internal annular enlargements extending in the same direction and provided at the inner and outer edges of the clamping discs, so that a hollow space is formed between the filtering material and the plate of the clamping disc.

The clamping disc located under the filtering material is provided at its outer edge with openings for the admission of liquid into the filter chamber, and the disc located above the filtering material is provided with corresponding openings in the inner edge for the outflow of the liquid which has been purified by the interposed filtering material.

The disadvantage of this construction is that when assembling the separate filter chambers, two clamping discs come to lie adjacent one another without an interposed layer of filtering material which forms packing. In a practical construction the bottom and top clamping discs are connected together, for example by rivets. These rivets also serve to press together the discs which, for economizing in space, are made as thin as possible and consequently have very little resistance to distortion, and therefore in general do not lie flat upon one another so tightly as to prevent a passage of liquid between them.

Experience, however, has shown that an effective packing is impossible. When using these filters on fine working machines, for example grinding machines, the fine grinding slime passes between the clamping discs and especially through the rivet holes. The fineness of filtering desired in such a case is so great that even fine textures are unsuitable, and filter paste-boards are used. The efficiency of the entire device is therefore questionable when provision is not made that no soiled liquids whatsoever can pass through a separate passage into the stream of liquid which has already been purified, and thus nullify the trouble and time which has been taken up in obtaining an extremely high degree of filtering. In addition, the assembling of the discs is tedious and an effective rigid connection between two discs is practically impossible, as when assembling, the resilient plates tend to press the rivet connection apart and in the course of time loosen the same.

Filter supporting discs are known which are so constructed that they serve both as the cover for one filter chamber and the bottom of the filter chamber located next above. These discs are, however, of shapes which do not permit of any resiliency therein, which is absolutely necessary both for the correct clamping of the filtering material and also for obtaining an effective packing between the separate chambers.

According to the invention these difficulties are eliminated in that each clamping disc is provided with four or more annular enlargements arranged coaxially and extending upwardly and downwardly in pairs from the clamping disc plate, and forming the supporting surfaces for the adjacent clamping disc.

In this manner it is possible, even in the case of discs which are themselves resilient and clamp the filtering material in a level plane, to so shape the discs that a single disc forms both the cover of one filter chamber and the bottom of the chamber located next above.

The drawings illustrate examples of filters according to the invention:

Figure 1:
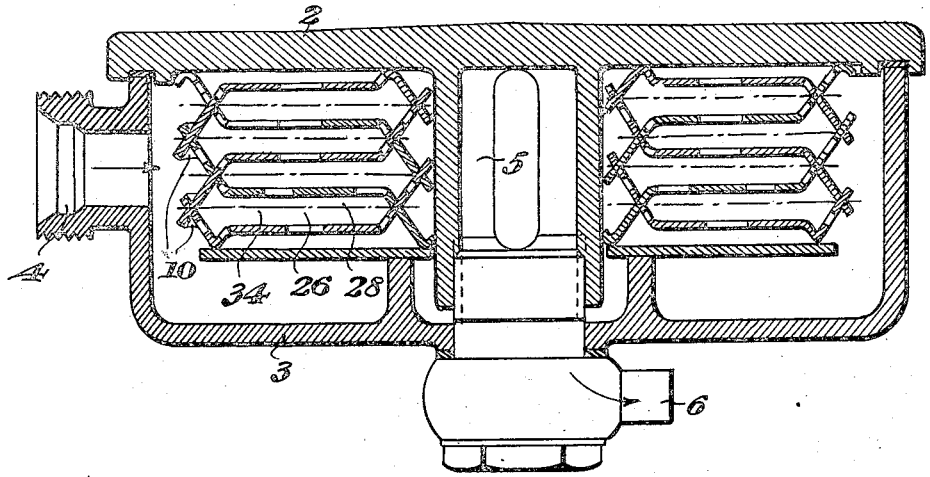
Figure 1 shows the arrangement of the clamping discs in a filter casing.

In Fig. 1 the filter, indicated generally by the reference numeral 1, consists of a cover 2 bearing the filter insertion, and a casing 3 for the liquid. The liquid to be filtered is fed to the casing 3 through an opening 4, fills the interior of the casing 3, and is drained off through a central outlet 5 after having passed through filter chambers 26, 28 formed by clamping discs 10 and the intermediate filtering material 34. A pivoted outlet 6 brings the filtered liquid to the place of consumption. Instead of the arrangement and mounting of the filter pile shown in the drawings, other arrangements are possible.

Figure 2:
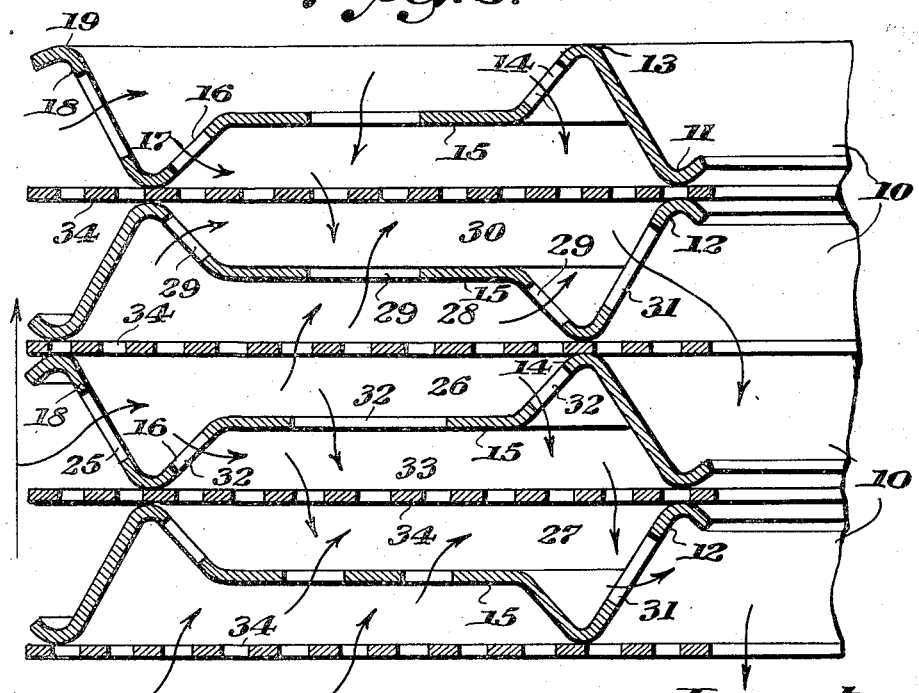
Fig. 2 shows the arrangement of the liquid openings in the discs for a single filtration.

The clamping discs 10 shown in Fig. 2 consist of centre plates 15 having upwardly and downwardly bent parts 14, 16 arranged at an angle to the plate 15. The bent parts are reversely bent or curved to form annular collars 13, 17 to support succeeding clamping discs. Coaxially to the collars 13, 17 are arranged other annular collars 11, 19 connected to the collars 13, 17 by parts 12, 18 extending in opposite directions to the parts 14, 16. The arrangement of the annular collars is such that each clamping disc has four or more collars which are arranged coaxially and upwardly and downwardly in pairs.

Fig. 2 also shows the order in which the clamping discs are situated within the filter pile and their position in relation to the intermediate filtering material. The filter chambers 26 and 28 are formed by similarly shaped clamping discs 10 arranged in reversed direction about the intermediate filtration material 34.

According to whether single, double or multiple filtering is desired, the clamping discs are provided with differently located liquid openings.

In an appliance for single filtration, the disc 10 has an inlet opening 25 in the outer part 18. The liquid to be purified passes through this opening into chamber 26 and from here it passes through the filtration material 34 into the chamber 28, from which it passes through openings 29 into chamber 30 and finally through outlet 31 on the inner angular face of the clamping disc to the filter outlet. Openings 32 in the clamping plate parts 15 enable the liquid immediately after entering the chamber 26 to pass into the chamber 33, from which, after passing through the filter material 34, it enters the chamber 27 and finally reaches the outlet openings 31.

Thus the liquid flow, after entering the filter chamber, can be divided into two streams, one of which passes upwards and the other downwards through the next layer of filtration material.

The clamping discs are provided within the ribs or collars 13 and 17, with liquid openings 29, 32 of convenient position and with alternately disposed inlet openings 25 in the outer part 18, and outlet openings 31 in the part 12.

Figure 3:
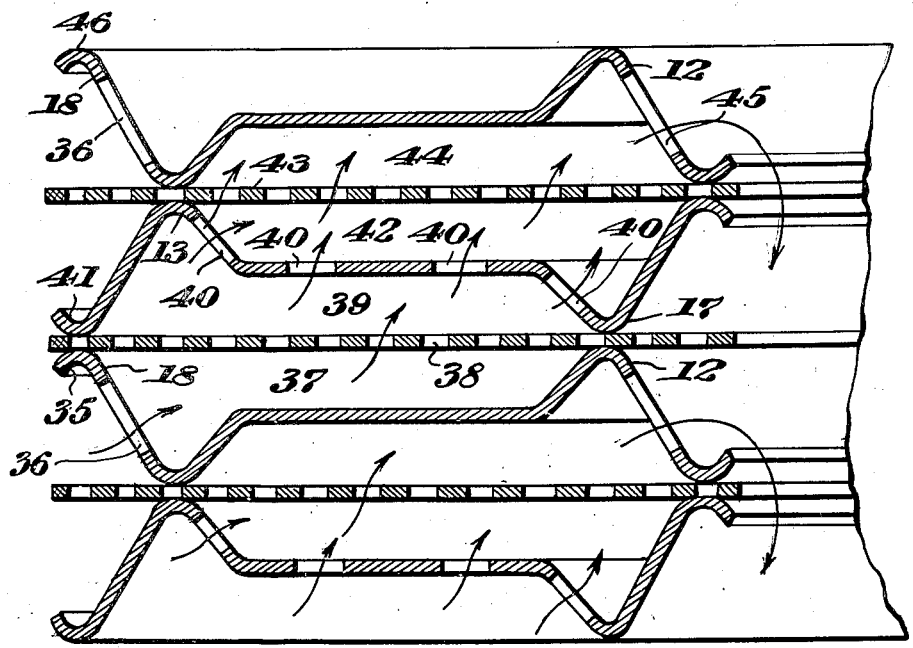
Fig. 3 shows the position of the liquid openings for a double filtration.

When a double filtration is desired, as shown in Fig. 3, the clamping disc 35 is provided with an opening 36 in the outer rib or collar 18. The liquid enters the chamber 37, passes through the filtration material 38 into the chamber 39 and after passing through openings 40 in an intermediate clamping disc 41 it passes into a chamber 42 from which, after traversing a further filter disc 43, it reaches a chamber 44 from which it can flow off through an opening 45 in the inner rib or collar 12 of the clamping disc 46. The clamping plate 46 has a further opening 36 in the outer collar 18 to enable the liquid flow to reach the upper chamber system. Furthermore, the clamping plate 35 is perforated at the outer collar 18 and inner collar 12 to ensure the draining off of the lower stream of liquid. The arrangement of the liquid openings for double filtering is generally made in such a manner that an intermediate disc 41 is introduced between the perforated discs 35, 46 whereby a partial stream of liquid can enter through the part 18 and a partial stream can pass out through the part 12, the disc 41 being provided with suitably located openings 40 between the collars 13 and 17.

I claim:

1. A flexible clamping disc for a pile filter said disc having a central opening, an intermediate flat annular web portion, an annular clamp collar portion of V-shape in cross-section with unequally long limbs between said central opening and said intermediate flat portion, a similar clamp collar between the said intermediate flat portion and the external periphery of the disc, said annular clamp collar portions projecting in opposite directions from the plane of said intermediate flat portion to provide two annular clamping surfaces on each side of the disc, the external angles of the V-shaped parts forming non-cutting clamping surfaces for filter material, and a plurality of flow control openings being provided in said disc located in at least two of the surfaces provided by the limbs of said collars and said flat intermediate portion.

2. A pile filter comprising a casing, a plurality of flexible clamping discs according to claim 1 piled coaxially and in superposed relation in said casing alternate discs being inverted whereby the pairs of annular clamping surfaces of adjacent discs are in clamping relationship with each other, plates of filter material clamped between said edges and radially tensioned by elastic deformation of said discs, means in said casing for engaging the lowermost clamping disc by means of its downwardly extending collar portions, clamping means extending through the central openings of said discs, an inlet for liquid communicating with some of said flow control openings in the clamping discs, and an outlet for liquid communicating with others of said flow control openings.

WOLFGANG MAUTZ.